US009120882B2

(12) United States Patent
Janssens et al.

(10) Patent No.: US 9,120,882 B2
(45) Date of Patent: Sep. 1, 2015

(54) PROCESS FOR PURGING PROPANE IN A POLYPROPYLENE MANUFACTURING PROCESS

(71) Applicant: TOTAL RESEARCH & TECHNOLOGY FELUY, Seneffe (BE)

(72) Inventors: Els Janssens, Liedekerke (BE); Laurent Avaullee, Serres-Castet (FR); Marc Richet, Mons (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

(21) Appl. No.: 14/374,633

(22) PCT Filed: Jan. 24, 2013

(86) PCT No.: PCT/EP2013/051362
§ 371 (c)(1),
(2) Date: Jul. 25, 2014

(87) PCT Pub. No.: WO2013/110718
PCT Pub. Date: Aug. 1, 2013

(65) Prior Publication Data
US 2015/0005459 A1 Jan. 1, 2015

(30) Foreign Application Priority Data
Jan. 26, 2012 (EP) .................................... 12152650

(51) Int. Cl.
C08F 2/00 (2006.01)
C08F 110/02 (2006.01)
(Continued)

(52) U.S. Cl.
CPC ............... *C08F 110/06* (2013.01); *C08F 6/001* (2013.01); *C08L 23/10* (2013.01)

(58) Field of Classification Search
CPC ......... C08F 6/001; C08F 110/06; C08L 23/10
USPC .................... 526/68, 77, 351; 95/50
See application file for complete search history.

(56) References Cited

U.S. PATENT DOCUMENTS 6,271,319 B1 * 8/2001 Baker et al. ..................... 526/68
2004/0000513 A1 1/2004 Colling et al.
(Continued)

FOREIGN PATENT DOCUMENTS

| FR | 2886646 A1 | 12/2006 |
|---|---|---|
| WO | 2005082957 A1 | 9/2005 |
| WO | 2008084415 A1 | 7/2008 |
| WO | 2009106706 A1 | 9/2009 |
| WO | 2011037820 A1 | 3/2011 |

OTHER PUBLICATIONS

Ilinitch, O. M., Semin, G. L, Chertova, M. V., Zamaraev, K. I. "Novel Polymeric Membranes for Separation of Hydrocarbons", Journal of Membrane Science 66 (1992) pp. 1-8.

(Continued)

*Primary Examiner* — William Cheung

(57) ABSTRACT

A process can include polymerizing propylene in a polymerization zone, withdrawing an effluent, and sending the effluent to a separation zone. A stream can be sent from the separation zone to a splitter to produce an overhead and a bottom stream. The overhead can be recycled to the polymerization zone, and the bottom stream can be sent to a membrane separation zone to produce a permeate and a purge. Optionally, the bottom stream can be washed in a scrubber, and an overhead of the scrubber can be sent to the membrane separation zone. The permeate can be recycled to the polymerization zone. A process can include providing a membrane separation zone to a polypropylene manufacturing facility that includes a polymerization zone, a separation zone, a splitter, and optionally a scrubber. The membrane separation zone can be fed a bottoms stream of the splitter or an overhead of the scrubber.

16 Claims, 1 Drawing Sheet

(51) Int. Cl.
*B01D 53/22* (2006.01)
*C08F 110/06* (2006.01)
*C08L 23/10* (2006.01)
*C08F 6/00* (2006.01)

(56) References Cited

U.S. PATENT DOCUMENTS

2004/0182786 A1    9/2004  Colling et al.
2006/0266213 A1*  11/2006  Riu et al. .................. 95/50
2011/0049051 A1    3/2011  Cougard et al.

OTHER PUBLICATIONS

Shimazu, A., Miyazaki, T., Maeda, M., Ikeda, K., "Relationship Between the Chemical Structures and the Solubility, Diffusivity and Perinselectivity of Propylene and Propane in 6FDA-Based Polyimides", Journal of Polymer Science: Part B: Polymer Physics, vol. 38 (2000) pp. 2525-2536.

Tanaka, K., Taguchi, A., Hao, J., Kita, H., Okamoto, K., "Permeation and Separation Properties of Polyimide Membranes to Olefins and Paraffins", Journal of Membrane Science 121 (1996) pp. 197-207.

* cited by examiner

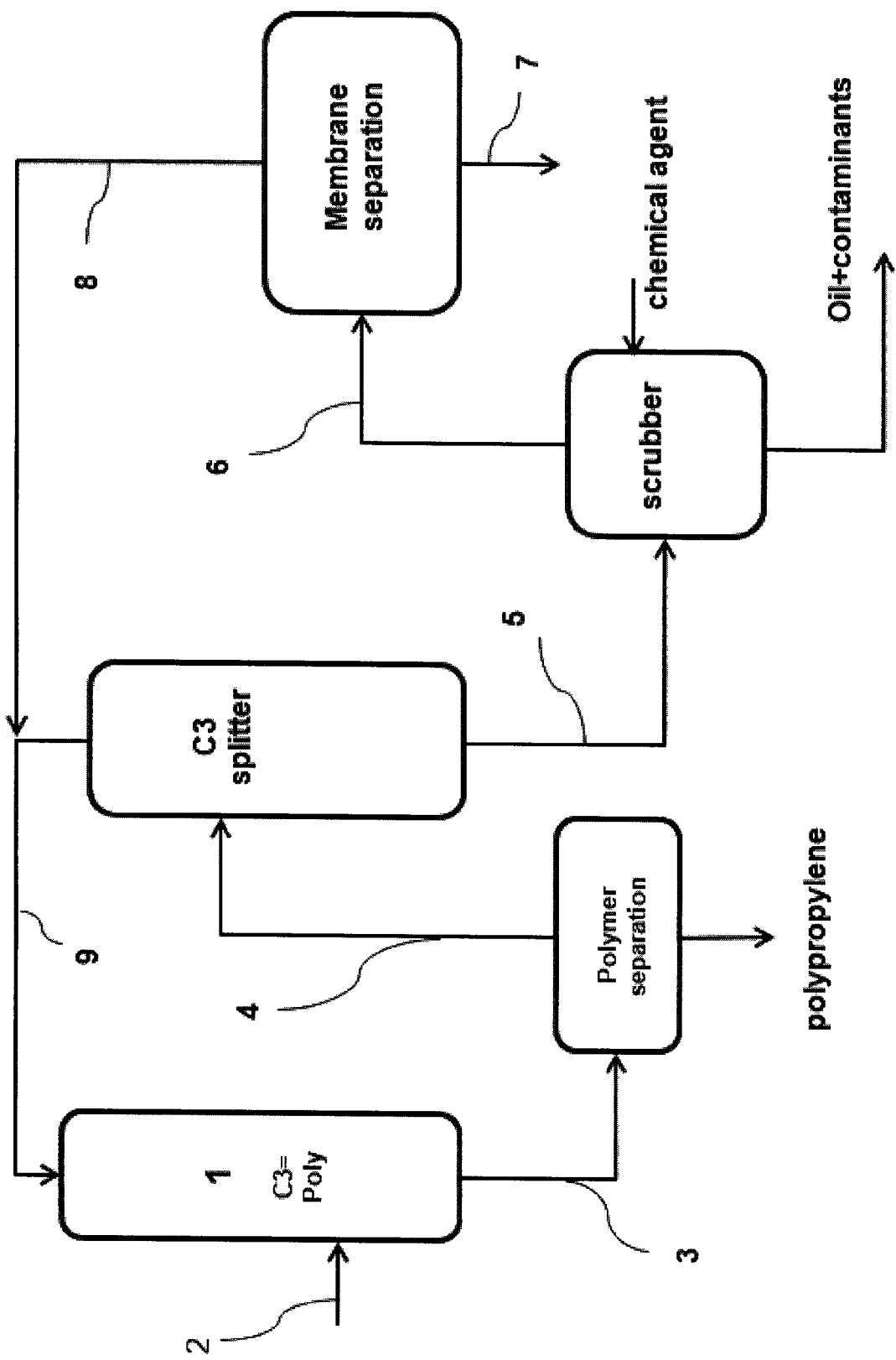

PROCESS FOR PURGING PROPANE IN A POLYPROPYLENE MANUFACTURING PROCESS

CROSS REFERENCE TO RELATED APPLICATIONS

This application claims the benefit of PCT/EP2013/051362, filed on Jan. 24, 2013, which claims priority from European Application No. 12152650.3, filed on Jan. 26, 2012.

FIELD OF THE INVENTION

The present invention relates to a process for purging propane in a polypropylene manufacturing process.

In a typical polymerization process, propylene monomer, catalysts and other agents are introduced into a high-pressure reactor. The raw effluent from the reactor is transferred continuously to a flash tank, from which a stream of raw polymer is withdrawn for further purification. A stream of overhead gases, containing unreacted monomer, is also withdrawn from the flash tank and is recirculated to the reactor. Thus, the propylene feed to the reactor is a combination of fresh propylene and propylene recirculated in the reactor/flash process loop. The fresh feed is usually polymer-grade propylene, a high-purity reagent that has a propylene content of 99+%, the remaining 1% or less being mostly propane, which passes unchanged through the reactor. Although the proportion of inert gas introduced into the reactor loop with the fresh feed in this way is small, the amount circulating builds up quickly, reducing the catalyst activity and reactor productivity. Propane build-up is usually controlled to a steady-state propane content in the loop in the range about 5-30%, by continuously venting a small fraction of the overhead gas from the recirculation loop.

BACKGROUND OF THE INVENTION

U.S. Pat. No. 6,271,319 describes a process for polypropylene manufacturing, including treating a vent stream from the polymerization reactor, to recover propylene for return to the reactor. The process involves using a gas separation membrane to separate propylene from propane in the reactor vent stream. The membrane separation step results in a residue stream typically containing as much as 30% propane or more, which is vented from the polymerization process, and a permeate stream containing 95% or less propylene, which is recirculated to the polymerization reactor. The membrane separation operates on a rich propylene stream.

WO 2005-082957 describes a process for making polypropylene. The process comprises contacting an oxygenate stream with an olefin forming catalyst to form an olefin stream. An intermediate grade propylene stream is separated from the olefin stream, with the intermediate grade propylene stream preferably containing less than 99.5 wt % propylene, based on total weight of the stream. In one embodiment, the intermediate grade propylene stream is contacted with a polypropylene forming catalyst to form polypropylene and unreacted by-product. Propane is removed from the unreacted by-product to form at least one purge stream and a propylene containing recycle stream. At [0092] is cited "In general, propane and propylene will be recovered by way of the purge stream and, preferably, a substantial portion of the propane is separated from the unreacted propylene so that a substantial amount of propane is not recycled to the reaction process. Such separation of propane from the purge stream can be accomplished by conventional means, including distillation or separation using molecular sieves or membranes."

WO 2008-084415 relates to a process for the membrane-based separation of propane and propylene, said process comprising the steps of: feeding a feed stream comprising propylene and propane to a first membrane, said first membrane comprising a feed port, a residue port, and a non-permeate port, at a temperature at or slightly above the dewpoint of propylene and a pressure between about 400 psia and about 600 psia, said first membrane having a selectivity for propylene of at least 6.5, whereby at least a portion of a first non-permeate stream condenses on or about said first membrane; and extracting a first permeate propylene enriched stream, wherein said permeate stream is extracted at or about the same temperature as said feed stream. The propylene propane separation is cited but there is no link with a propylene polymerization zone.

US 2004-000513 discloses an apparatus for economical separation of fluid mixtures. Broadly, apparatus of the invention comprises modules using solid perm-selective membranes. More particularly, the invention relates to a plurality of membrane modules disposed in a first product group, a second product group, and optionally one or more intermediate group. Apparatus of the invention with the membrane modules in multiple groups is beneficially useful for simultaneous recovery of a very pure permeate product and a desired non-permeate product from a mixture containing organic compounds. There is no link with a propylene polymerization zone.

US 2006-266213 relates to methods for treating a gas mixture of at least propylene and propane, in order to separate the propylene from the propane. The gas mixture is brought into contact with a membrane enabling the selective permeation of the propylene with respect to the propane. A propylene-enriched permeate and a propane-enriched retentate is formed. The propylene concentration of the permeate in the membrane is then reduced with a sweeping gas. This process is used in connection with a propylene polymerization zone but there is no propylene-propane splitter.

US 2004-182786 Apparatus and processes are disclosed for economical separation of fluid mixtures. Broadly, apparatus of the invention is an integrated fractional distillation and perm-selective membrane separation apparatus. More particularly, the integrated apparatus comprises a fractional distillation column and one or more membrane device utilizing solid permselective membranes. Processes of the invention are particularly useful for simultaneous recovery of a very pure permeate product, a desired non-permeate stream, and one or more distillate products from a fluid mixture containing at least two compounds of different boiling point temperatures. There is no link with a propylene polymerization zone and the membrane operates on a rich propylene stream.

FR 2886646 describes a process for separating one or more compound(s), including at least one n-paraffin, in a hydrocarbon feedstock, in which: A stream, or a portion of a stream of said feedstock, is passed successively and in any order into at least one distillation column and at least one membrane separation unit comprising a selective membrane with regard to at least one n-paraffin; and one or more stream(s) is (are) recovered from the column and the membrane separation unit, each of said streams being enriched respectively with one of said compounds, and at least one of said streams being enriched with at least one n-paraffin. Installation for the implementation of this process. The invention relates in particular to a process and an installation that allow the fractionation of a petroleum fraction that contains hydrocarbon molecules with close boiling points. There is no link with a propylene polymerization zone.

WO 2009-106706 describes a propane/propylene separation process employing a distillation column and at least one membrane separation unit consisting of one or more modules working in series, said membrane separation unit being placed either upstream, or downstream, or upstream and downstream of the distillation column. There is no link with a propylene polymerization zone.

It has now been discovered a new process for the purging of propane in a polypropylene manufacturing process

BRIEF DESCRIPTION OF THE INVENTION

The present invention relates to the purging of propane in a polypropylene manufacturing process comprising,
a) polymerizing propylene in a polymerization zone,
b) withdrawing from said polymerization zone an effluent comprising polypropylene, propylene, propane and optionally a solvent,
c) sending said effluent to a separation zone thereby producing polypropylene, optionally the solvent and a stream comprising propylene and propane,
d) optionally recycling the solvent to the polymerization zone,
e) sending said propylene and propane stream to a splitter (also referred to as the C3 splitter) thereby producing an overhead consisting essentially of propylene recycled to the polymerization zone and a rich propane bottom stream comprising a minor part of propylene,
f) sending the bottom stream to a membrane separation zone thereby producing a permeate having an enhanced propylene content and a reduced propane content and a purge having an enhanced propane content and a reduced propylene content,
g) recycling the permeate to the polymerization zone.

In an embodiment the bottom stream produced in the splitter of step e) is washed in a scrubber to remove contaminants and the overhead of said scrubber is sent to the membrane separation zone.

In an embodiment only a part of the splitter bottom stream, or of the scrubber overhead if any, is sent to the membrane separation zone, the remaining part is purged or recycled to the polymerization zone.

In an embodiment only a part of the splitter bottom stream of step e) is washed in a scrubber to remove contaminants and the overhead of said scrubber is sent to the membrane separation zone, the remaining part is purged or recycled to the polymerization zone.

An advantage of the present invention is the membrane separation zone fed with a propane rich stream, this leads to a reduced propylene stream and as a consequence a membrane separation zone of reduced size by comparison with a rich propylene feedstock.

Another advantage is the feedstock of the membrane separation zone at higher temperature by comparison with a feedstock coming from another part of the splitter which is of course at lower temperature. The higher the temperature the higher the permeability through the membrane.

Of course the propane purge provides a purge of other components from the polymerization reactor loop.

In an embodiment the fresh propylene is sent to the polymerization zone. Optionally the fresh propylene, in whole or in part, is sent firstly to the C3 splitter.

Optionally the rich propane bottom stream from the splitter is withdrawn one or more plates above the bottom and the heavies are purge at the bottoms.

Optionally the permeate from the membrane separation zone, having a rich propylene content, is sent in whole or in part to the C3 splitter.

The present invention also relates to the debottlenecking of a polypropylene manufacturing facility comprising,
a polymerization zone,
a separation zone to recover the polypropylene, optionally the solvent and a stream comprising propylene and propane and a splitter to separate propane and propylene.

The production of the polymerization zone can be increased by changing operating conditions e.g. the catalyst, the temperature but the splitter is the bottleneck. An advantageous way to debottleneck the splitter is to let propylene going down in the bottom and introduce a membrane separation zone fed with the splitter bottom thereby producing a purge and a permeate recycled to the polymerization zone.

The present invention is the debottlenecking of a polypropylene manufacturing facility comprising,
a polymerization zone,
a separation zone to recover the polypropylene, optionally the solvent and a stream comprising propylene and propane and a splitter (also referred to as the C3 splitter) to separate propane and propylene, wherein,
a membrane separation zone is provided, said membrane separation zone is fed with the splitter bottom thereby producing a purge and a permeate recycled to the polymerization zone.

In an embodiment a scrubber is inserted between the splitter bottoms and the membrane separation zone stream to wash the splitter bottom stream to remove contaminants and the overhead of said scrubber is sent to the membrane separation zone.

In an embodiment only a part of the splitter bottom stream, or of the scrubber overhead if any, is sent to the membrane separation zone, the remaining part is purged or recycled to the polymerization zone.

In an embodiment only a part of the splitter bottom stream is washed in a scrubber to remove contaminants and the overhead of said scrubber is sent to the membrane separation zone, the remaining part is purged or recycled to the polymerization zone.

In an embodiment the fresh propylene is sent to the polymerization zone. Optionally the fresh propylene, in whole or in part, is sent firstly to the C3 splitter.

Optionally the rich propane bottom stream from the splitter is withdrawn one or more plates above the bottom and the heavies are purged at the bottoms.

Optionally the permeate from the membrane separation zone, having a rich propylene content, is sent in whole or in part to the C3 splitter.

Advantage of said debottlenecking by comparison with removing the existing splitter and providing a larger one is the reduced cost as well as the shorter shutdown of the polymerization, because the membrane separation zone can be erected while the polymerization is producing.

BRIEF DESCRIPTION OF THE FIGURES

FIG. 1 depicts an embodiment of a polypropylene manufacturing facility including a membrane separation zone.

DETAILED DESCRIPTION OF THE INVENTION

FIG. 1 depicts an embodiment of the invention. (1) is the polymerization zone, (2) is the fresh propylene inlet as well as the catalyst and other ingredients effective for the polymerization. (3) is the effluent comprising polypropylene, propylene, propane and optionally a solvent if the polymerization has been carried out in a solvent other than propylene. (3) is sent to the separation zone thereby producing polypropylene, optionally the solvent (not shown on FIG. 1) and a stream (4) comprising propylene and propane. Stream (4) is sent to the splitter thereby producing an overhead (9) consisting essentially of propylene recycled to the polymerization zone (1) and a rich propane bottom stream (5) comprising a minor part of propylene. The bottom stream (5) produced in the splitter is washed with a chemical agent, optionally for example suspended or dissolved in oil, in a scrubber to remove contaminants and the overhead (6) is sent to the membrane separation zone. The membrane separation zone produces a permeate (8) having an enhanced propylene content and a reduced propane content and a purge (7) having an enhanced propane content and a reduced propylene content, the permeate (8) is recycled to the polymerization zone. Optionally the fresh propylene, in whole or in part, is sent firstly to the C3 splitter. Optionally stream 5, the rich propane bottom stream, is withdrawn one or more plates above the bottom and the heavies are purged at the bottoms. Optionally stream 8, having a rich propylene content, is sent in whole or in part to the C3 splitter.

As regards the polymerization zone of step a), the term polypropylene as used herein includes homopolymers of propylene, propylene copolymers (for example with ethylene or butylene), and propylene terpolymers, in both unsubstituted and substituted (such as halogenated) forms. The process provides selective purging of propane from the polymerization reactor loop. By a reactor loop, we mean a configuration in which at least a part of the effluent stream from the polymerization reactor is recirculated directly or indirectly to the reactor. The process can be applied to any propylene polymerization loop in which propylene is fed to the reactor, and in which propylene and propane are present in the effluent from the reactor. The primary goals of the process are to remove propane from the reactor loop while controlling loss of propylene, and to return the recovered propylene as feed to the reactor. Light components up to ethylene and ethane are purged before the C3 splitter.

Fresh propylene is sent to the polymerization zone, this is typically, but not necessarily, polymer-grade propylene with a propylene content of 99% or above, such as 99.5%. Catalysts, stabilizers, inhibitors, solvents or other components may be introduced into the polymerization zone as required, depending upon the specific polymerization technique being used. One or multiple reactors may be involved in the process, with the individual reactors carrying out the same or different unit operations. The product manufactured may be any type of propylene polymer, including, but not limited to, homopolymers, such as a medium- or high-impact homopolymers; substituted, including halogenated, homopolymers; copolymers, such as random and block copolymers of ethylene and propylene; and terpolymers.

Propylene polymerization may be carried out in the liquid phase or the gas phase. Suitable catalysts are titanium chlorides and/or alkylaluminum chlorides.

The gas-phase process is usually performed at high pressure, such as 30 to 40 barg, and at a temperature of about 70-90° C. In the gas-phase process, propylene is introduced to the reactor as a liquid. Within the reactor the propylene is allowed to evaporate to keep the reaction temperature at a suitably low level. The polymer is formed as a powder entrained with the propylene gas, and is separated from the gas by one or more cyclone separators at the top of the reactor vessel. The unreacted propylene, propane and any other light contaminants are withdrawn from the reactor, cooled in a heat exchanger and liquefied and recirculated.

In the liquid-phase process, propylene, catalyst and a solvent, such as hexane, are introduced to the reactor, which is operated again at high pressure, such as 3 to 50 barg, and temperature, such as about 70° C. In this case, the polymer forms as particles suspended in the solvent, and the resulting slurry is withdrawn and separated for polymer purification and monomer recycle.

It will be apparent that the reactor operating conditions and functioning are not critical to the invention and can and will vary from plant to plant. Thus, the scope of the invention embraces all propylene polymerization reactor types and operating conditions consistent with producing a propylene/propane purge stream amenable to membrane separation treatment associated with a splitter as set forth below.

As regards the separation zone of step c), the effluent originating from step b) can be in gaseous phase or liquid phase. Techniques that may be used to treat the effluent include flashing, cooling/condensation, distillation, absorption or combinations of these, depending on whether the effluent from the polymerization zone is in the liquid phase or the gas phase, and on what other components are present. Physical phase separation, of powder or particle streams from gas streams, or of liquid streams from gas streams, can be carried out in simple gravity separators, cyclone separators or any other convenient type. All of these techniques and pieces of equipment are familiar and readily available.

As a representative, but non-limiting example, if the effluent is in the liquid phase, the liquid can be passed first to one or more flash steps. Typically, flashing is achieved by letting down the pressure on the liquid, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. Flashing may be carried out in a single stage, but is preferably done in two or more stages at progressively lower pressures. The polymer-containing fraction is withdrawn from the bottom of the flash tank and is sent for polymer purification and finishing as is known in the art. As mentioned above, in liquid-phase processes the reactor effluent may include hexane and it may also contain hydrogen, added as an inert diluent to control polymerization, so, in this case, the flash overhead stream is a mix of propylene, propane, hexane, hydrogen and small quantities of other light hydrocarbons and agents that may have been added to facilitate polymerization. This stream can be reliquefied and then distilled to split the hexane and other C4+ hydrocarbons, as a bottom stream, from the propylene, propane and other light components, as an overhead stream. This overhead stream then forms the stream sent to the C3 splitter.

As a second representative, but non-limiting example, if the polymerization takes place in the gas phase, the reaction effluent is a mixture of polymer powder and propylene and other gases. This mixture is separated by passing through a tube inside the reactor itself to one or more cyclone separators. The powder phase is removed for finishing. The unreacted propylene, propane and any other light contaminants are withdrawn as a gas phase from the reactor, and form the stream sent to the C3 splitter. Since the reactor feed can be liquid in this case, the recirculation stream must be cooled and condensed back to liquid form before it is returned to the reactor inlet.

As regards the splitter of step e), this is advantageously a distillation column or an arrangement of two or more distillation columns. Said splitter is known in itself. The propylene-propane inlet stream coming from step c) can comprise up to 30 w % propane, advantageously from 0.5 to 30 w %. In an embodiment said stream comprises from 0.5 to 20 w % propane, advantageously from 0.5 to 15 w %, preferably from 0.5 to 10 w %. Said inlet stream of the splitter may also contain lighter components such as H2, CH4, $C_2H_4$ and $C_2H_6$. Advantageously they are purged before the splitter. The proportion of propylene in the splitter bottom can be up to 40 w % (this means 60 w % propane) and advantageously from 1 to 40 w %. In an embodiment the propylene proportion is from 1 to 30 w %, advantageously from 1 to 20 w %. In another embodiment the propylene proportion is from 1 to 20 w %. The overhead has a propylene content of at least 99.5 w % (which means 0.5% propane). By way of example a splitter producing an overhead having a propylene content of 99.5 w % and a bottom having a propylene content of 35 w %, a propane content of 65 w % operates at a pressure of 16 bars and a bottom temperature of 50° C.

As regards the optional scrubber, it can be any vessel that allows washing the splitter bottom stream with at least one chemical agent capable of removing contaminants from the splitter bottom stream to prevent fouling of the membranes in the membrane separation zone. For the washing the splitter bottom stream and said chemical agent are brought into contact in the scrubber. For example the splitter bottom stream may be introduced at or near the bottom of the scrubber while the chemical agent is introduced at or near the top of the scrubber, then brought into contact, and the washed splitter bottom stream is recovered as scrubber overhead and sent to the membrane separation zone. For example, the splitter bottom stream may simply be bubbled through such chemical agent or a solution thereof. Preferably, said scrubber is a continuously stirred tank reactor or a gas/liquid contactor of the shower tray type. Most preferably, said scrubber is a gas/liquid contactor of the shower tray type.

With regards to the conditions in the scrubber, it is preferred that the temperature therein is above the boiling point of the splitter bottom stream. When feeding it to the contact vessel the splitter bottom stream may be heated to avoid condensation in the scrubber.

The contaminants comprised in the splitter bottom stream to be removed in the scrubber preferably comprise one or more organoaluminum compounds selected from the group consisting of organoaluminum compounds represented by the general formula $R_{3-n}AlX_n$ (I), wherein each R is independently selected from alkyl having from one to ten carbon atoms, each X is independently a halogen atom, and n is 0, 1 or 2; alkylalumoxanes wherein alkyl is selected from alkyl having from one to ten carbon atoms; and blends of both. Preferably R is an alkyl having from one to six carbons atoms, such as for example methyl, ethyl, n-propyl, iso-propyl, n-butyl, sec-butyl, tert-butyl, pentyl and hexyl. Most preferably R is ethyl. Preferably X is selected from the group consisting of fluorine, chlorine, bromine and iodine. Most preferably X is chlorine. Preferably n is 0 or 1. Most preferably n is 0.

Exemplary organoaluminum compounds purified in accordance with the present invention are trimethylaluminum ($Me_3Al$), triethylaluminum ($Et_3Al$, frequently referred to as "TEAL"), tri-n-propylaluminum ($nPr_3Al$), tri-iso-propylaluminum ($iPr_3Al$), tri-n-butylaluminum ($nBu_3Al$), tri-iso-butylaluminum ($iBu_3Al$, frequently referred to as "TIBAL"), and tri-sec-butylaluminum ($secBu_3Al$). Triethylaluminum is the most preferred one.

Alkylalumoxanes may be produced by hydrolysis of the respective trialkylaluminum. Preferred examples of alkylalumoxanes include methylalumoxane (MAO), ethylalumoxane, n-propylalumoxane, iso-propylalumoxane, n-butylalumoxane, iso-butylalumoxane, sec-butylalumoxane, and octylalumoxane. Methylalumoxane (MAO) is most preferred.

The chemical agent used in the present process needs to be capable of reacting with such organoaluminum compounds.

For the purposes of the present application the term "capable of reacting" is used to denote that the equilibrium between reactants, i.e. chemical agent and organoaluminum compound(s), and products lies almost entirely on the product side. Preferably, at least 90 mol % of the initial amount of reactants is present as product, more preferably at least 95 mol %, even more preferably at least 97 mol %, and most preferably at least 99 mol %.

Preferably, said chemical agent comprises at least one compound selected from the list consisting of H—$X^1$, $X^1$-$A^1$-$X^2$, $X^1$-$A^1$-$A^2$-$X^2$ and $X^1$-$A^3$=$A^4$-$X^2$, wherein $A^1$ and $A^2$ are independently selected from the group consisting of $CR^1R^2$, C=O and $NR^1$, of which $CR^1R^2$ and C=O are preferred and $CR^1R^2$ is most preferred;

$A^3$ and $A^4$ are either independently selected from the group consisting of $CR^1$ and N or alternatively both, $A^3$ and $A^4$, are carbon forming part of an aromatic ring or fused ring system; of which is preferred that $A^3$ and $A^4$ are $CR^1$ or $A^3$ and $A^4$ are carbon forming part of an aromatic ring or fused ring system;

$X^1$ and $X^2$ are independently selected from the group consisting of $OR^1$, $SR^1$, =$NR^1$, $NR^1R^2$, $PR^1R^2$, C(=O)$R^1$, C(=O)$OR^1$, OC(=O)$R^1$, C(=O)$NR^1R^2$ and $NR^1C$(=O)$R^2$, of which $OR^1$, =$NR^1$, $NR^1R^2$, C(=O)$OR^1$ and C(=O)$NR^1R^2$ are preferred; and $R^1$ and $R^2$ are independently selected from the group consisting of hydrogen, alkyl, aryl, substituted alkyl and substituted aryl, wherein substituted alkyl denotes an alkyl substituted with $X^1$ and substituted aryl denotes an aryl substituted with $X^1$;

with the provision that H—$X^1$ is not HOH.

Components $A^1$, $A^2$, $A^3$, $A^4$, $X^1$, $X^2$, $R^1$ and $R^2$ may be chosen such that one or more, preferably six-membered, saturated or unsaturated rings may be formed. Optionally, such rings may also be fused. For example, in $X^1$-$A^1$-$X^2$ component $A^1$, and in $X^1$-$A^1$-$A^2$-$X^2$ component $A^1$ or component $A^2$ or both may be a cyclohexyl ring. Or for example, in $X^1$-$A^1$-$A^2$-$X^2$ with $A^1$ and $A^2$ both being $CR^1R^2$ both substituents $R^1$ together may form —($CH_2$—)$_4$—, thus resulting in a cyclohexyl ring. Or for example, compound $X^1$-$A^3$=$A^4$-$X^2$ with $A^3$ and $A^4$ forming an ortho-disubstituted benzene ring as shown in formula (II) below. Or for example, in $X^1$-$A^3$=$A^4$-$X^2$ component $X^1$ may be =$NR^1$, components $A^3$ and $A^4$ may be $CR^{1'}$ and $CR^{1''}$, with $R^1$, $R^{1'}$ and $R^{1''}$ chosen such that the resulting compound is a quinoline-derivative, an example of which is shown in formula (III) below.

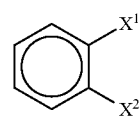

(II)

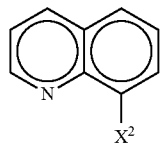

(III)

It is noted that, as is shown in formula (III), $=NR^1$ may also indicate that the nitrogen atom forms part of an aromatic ring or an aromatic fused ring system.

With regards to $R^1$ and $R^2$ in case they are a substituted alkyl: Preferably $R^1$ and $R^2$ are independently selected from the group consisting of $(-CH_2-CH_2-O)_m-R^3$, $(-CH_2-CH_2-S)_m-R^3$, $(-CH_2-CH_2-NR^3)_m-R^3$, $(-CH_2-CH_2-PR^3)_m-R^3$, $(-CH_2-C(=O))_m-R^3$, $(-CH_2-C(=O)O)_m-R^3$, $(-CH_2-OC(=O))_m-R^3$, $(-CH_2-C(=O)NR^3)_m-R^3$ and $(-CH_2-NR^3C(=O))_m-R^3$, wherein m is a number ranging from 1 to 400, and in one aspect is 1 or 2 or 3, and $R^3$ is selected from the group consisting of hydrogen, aryl and alkyl having from 1 to 40 carbon atoms. With respect to $R^3$, the preferred aryl is phenyl.

With regards to $R^1$ and $R^2$ in case they are a substituted aryl: Preferably $R^1$ and $R^2$ are independently selected from the group consisting of $-(-Ph-O)_m-R^3$, $(-Ph-S)_m-R^3$, $(-Ph-NR^3)_m-R^3$, $(-Ph-PR^3)_m-R^3$, $(-Ph-C(=O))_m-R^3$, $(-Ph-C(=O)O)_m-R^3$, $(-Ph-OC(=O))_m-R^3$, $(-Ph-C(=O)NR^3)_m-R^3$ and $(-Ph-NR^3C(=O))_m-R^3$, wherein Ph is a phenylene, m is a number ranging from 1 to 400, and in one aspect is 1 or 2 or 3, and $R^3$ is selected from the group consisting of hydrogen, aryl and alkyl having from 1 to 40 carbon atoms. More preferably $R^1$ and $R^2$ are independently selected from the group consisting of $-(-Ph-O)_m-R^3$, $(-Ph-NR^3)_m-R^3$, $(-Ph-C(=O)O)_m-R^3$, $(-Ph-OC(=O))_m-R^3$, $(-Ph-C(=O)NR^3)_m-R^3$ and $(-Ph-NR^3C(=O))_m-R^3$. With respect to $R^3$, the preferred aryl is phenyl.

With respect to $R^1$ and $R^2$ the most preferred aryl is an ortho-phenylene. Following IUPAC-nomenclature, the term "phenylene" refers to the bivalent radical of benzene, said radical having the general formula $C_6H_4$. Ortho-phenylene may be represented by "$1,2-C_6H_4$".

More preferably, said chemical agent is selected from the group consisting of $X^1-CR^4R^5-X^2$, $X^1-NR^6-X^2$, $X^1-C(=O)-C(=O)-X^2$, $X^1-CR^4R^5-CR^4R^5-X^2$ and $X^1-CR^7=CR^7-X^2$, wherein $X^1$ and $X^2$ are independently selected from the group consisting of $OR^1$, $SR^1$, $=NR^1$, $NR^1R^2$, $PR^1R^2$, $C(=O)R^1$, $C(=O)OR^1$, $OC(=O)R^1$, $C(=O)NR^1R^2$ and $NR^1C(=O)R^2$, of which $OR^1$, $=NR^1$, $NR^1R^2$, $C(=O)OR^1$ and $C(=O)NR^1R^2$ are preferred;

$R^1$ and $R^2$ are independently selected from the group consisting of hydrogen, alkyl, aryl, substituted alkyl and substituted aryl, wherein substituted alkyl denotes an alkyl substituted with $X^1$ and substituted aryl denotes an aryl substituted with $X^1$ and preferably are as defined above;

$R^4$ and $R^5$ are independently selected from the group consisting of hydrogen, alkyl, aryl and substituted alkyl, with substituted alkyl as defined above with m being 1 or 2 or 3; any $R^4$ and $R^5$ on the same carbon atom or neighboring carbon atoms may together form a saturated or unsaturated, preferably six-membered, ring, of cyclohexyl is preferred;

$R^6$ is hydrogen, alkyl, aryl and substituted alkyl, with substituted alkyl as defined above with m being 1 or 2 or 3;

$R^7$ is selected from the group consisting of hydrogen, alkyl, aryl and substituted alkyl, with substituted alkyl as defined above with m being 1 or 2 or 3; two groups $R^7$ on neighboring carbon atoms may together form a saturated or unsaturated, preferably six-membered, ring, of which cyclohexenyl and phenylene are preferred.

Even more preferably, said chemical agent is selected from the group consisting of the following classes of compounds (A) $HO-CH_2-CH_2-O-(CH_2-CH_2-O)_m-H$, wherein m is from 0 to 400;

(B) $(R^8OOC-CH_2-)_2N-CHR^9-CHR^9-N(-CH_2-COOR^8)_2$, wherein $R^8$ is selected from the group consisting of hydrogen, aryl and alkyl having from 1 to 40 carbon atoms, and more preferably $R^8$ is selected from the group consisting of hydrogen, methyl, ethyl, propyl, butyl and tert-butyl; and most preferably $R^8$ is hydrogen; and wherein $R^9$ is either hydrogen or $-CH_2-CH_2-$;

(C) a metal salt of $(HOOC-CH_2-)_2N-CHR^9-CHR^9-N(-CH_2-COOH)_2$, wherein the metal preferably is Na; and wherein $R^9$ is either hydrogen or $-CH_2-CH_2-$;

(D) ethoxylated alkylamines of formula $(C_pH_{2p+1})_qN(CH_2-CH_2-OH)_{3-q}$ with p being in the range from 1 to 30, more preferably in the range from 10 to 20; and q being 0, 1 or 2;

(E) $N(CH_2-COOH)_3$, $R^{10}N(CH_2-COOH)_2$, $R^{10}_2N(CH_2-COOH)$ and the respective sodium salts, wherein $R^{10}$ is selected from the group consisting of hydrogen, aryl and alkyl having from 1 to 40 carbon atoms; and (F) $X^3-A^5-X^4-(-A^6-X^4)_n-X^5$, wherein $A^5$ and $A^6$ may independently be selected from the group consisting of $-CH_2-CH_2-$, $-CH=CH-$ and ortho-phenylene; and wherein $X^3$ and $X^5$ are independently $OX^6$ or $NX^6X^7$ and $X^4$ is O or $NX^6$, with $X^6$ and $X^7$ being independently selected from the group consisting of $-CH_2-COOR^{11}$, $-CH_2-CH_2-OR^{11}$, $-CH_2-CH_2-NR^{11}_2$ and $-CH_2-C(=O)NR^{11}_2$, wherein n is in the range from 0 to 400, more preferably n is in the range from 1 to 10, even more preferably n is 0, 1, 2, 3, 4 or 5, and most preferably n is 1 or 2; and wherein $R^{11}$ is selected from the group consisting of hydrogen, aryl and alkyl having from 1 to 40 carbon atoms, with $R^{11}$ being more preferably selected from the group consisting of hydrogen, aryl and alkyl having from one to ten carbon atoms, and with $R^{11}$ being most preferably hydrogen; wherein consecutive units $-CH_2-CH_2-X^4$ may differ from one another;

(G) beta-diketones and beta-diketone derivatives of formula $R^{12}-C(=O)-CR^{13}R^{14}-C(=O)-R^{15}$ or of formula $X^6-C(=O)-CR^{13}R^{14}-C(=O)-X^7$, wherein $X^6$ and $X^7$ are independently $OR^{12}$ or $NR^{12}R^{13}$, and wherein $R^{12}$, $R^{13}$, $R^{14}$ and $R^{15}$ are independently selected from the group consisting of hydrogen, aryl and alkyl having from 1 to 40 carbon atoms, preferably are independently selected from the group consisting of hydrogen, aryl and alkyl having from one to ten carbon atoms;

(H) 1,2-dihydroxybenzene; and (J) 8-$X^8$-quinoline, wherein $X^8$ is selected from the group consisting of OH and $NR^{16}_2$ with $R^{16}$ selected from the group consisting of hydrogen and methyl with hydrogen being preferred.

Specific examples for (A) include glycol and polyethylene glycol, said polyethylene glycol having a preferred molecular weight of at least 100 and of at most 5000, more preferably of at most 4000 or 3000, even more preferably of at most 2000 and most preferably of at most 1000 g/mol.

Specific examples for (B) and (C) include $(HOOC-CH_2)_2N-CH_2-CH_2-N(CH_2-COOH)_2$ (ethylenediaminetetraacetic acid, EDTA, CAS-number 60-00-4), cyclohexanediamine-tetraacetic acid and their respective di-sodium salts.

Specific examples for (D) include the following compounds of general formula $(C_pH_{2p+1})N(CH_2-CH_2-OH)_2$, wherein p is from 12 to 18 (N—($C_{12}$-$C_{18}$ alkyl)bis(2-hydroxyethyl)amine, CAS-number 71786-60-2). Such compounds are commercially available for example as Atmer 163 (CAS-number 107043-84-5) or Armostat 400 (N—($C_{12}$-$C_{14}$ alkyl)bis(2-hydroxyethyl)amine, CAS-number 61791-31-9) or Armostat 300 (N—($C_{14}$-$C_{18}$ alkyl)bis(2-hydroxyethyl)amine, CAS-number 61791-44-4).

Specific examples for (E) include $N(CH_2-COOH)_3$ (nitrilotriacetic acid, CAS-number 139-13-9) and the respective sodium salts.

Specific examples for (F) include (HOOC—$CH_2$)$_2$N—$CH_2$—$CH_2$—N($CH_2$—COOH)—$CH_2$—$CH_2$—N($CH_2$—COOH)$_2$ (diethylenetriaminepentaacetic acid, DTPA, CAS-number 67-43-6), (HOOC—$CH_2$)$_2$N—($CH_2$—$CH_2$—O)$_2$—$CH_2$—$CH_2$—N($CH_2$—COOH)$_2$ (ethylenebis(oxyethylenenitrilo)tetra-acetic acid, EGTA, CAS-number 67-42-5), (HOOC—$CH_2$)$_2$N-(1,2-$C_6H_4$)—O—$CH2$-$CH_2$—O-(1,2-$C_6H_4$)—N($CH_2$—COOH)$_2$(2,2'-(ethylenedioxy)dianiline-N,N,N',N'-tetraacetic acid, BAPTA, CAS-number 85233-19-8), [(HOOC—$CH_2$)$_2$N—$CH_2$—$CH_2$—N(—$CH_2$—COOH)—$CH_2$—]$_2$ (triethylenetetraminehexaacetic acid, TTHA, CAS-number 869-52-3), and (HOOC—$CH_2$)$_2$N—$CH_2$—$CH_2$—N($CH_2$—COOH)($CH_2$—$CH_2$—OH)(N-(2-hydroxyethyl)-ethylenediamine-N,N,N'-triacetic acid, HEDTA) and the respective trisodium salt.

Specific examples for (J) include 8-quinolinol and 8-amino-quinoline.

Still even more preferably the chemical agent is selected from class (A) or class (D). Most preferably the chemical agent is selected from class (D).

Preferably, said chemical agent is suspended or dissolved in a liquid, thus forming a suspension or solution, in the following referred to as "solution", wherein said liquid is chemically inert towards organoaluminum compounds. Examples of such chemically inert diluents are saturated hydrocarbons, such as for example mineral oil.

Preferably, the concentration of chemical agent in said liquid is of at least 5 wt % and most preferably of at least 10 wt %, relative to the amount of said liquid. Preferably, said concentration is of at most 90 wt %, more preferably of at most 80 wt %, even more preferably of at most 70 wt %, and most preferably of at most 60 wt %, relative to the amount of said liquid. Alternatively, it is also possible to use the chemical agent in pure form, i.e. without the chemical agent being suspended or dissolved in a liquid. The concentration of chemical agent in said liquid is given as wt % relative to the total weight of the solution.

As regards step f) the membrane separation zone, it can be operated in the liquid phase or in the gaseous phase. The membrane unit contains a membrane that exhibits a substantially higher permeability for propylene than for propane. Over time, a variety of membrane types and materials have been reported in the prior art with apparently useful properties for propylene/propane separation.

Various kinds of membranes can be used:

carbon membranes that act as very fine sieves that separate on the basis of difference in molecular size. Inorganic membranes are characterized by good temperature and chemical resistance. Such membranes would be available commercially for propylene/propane separation, such as from Carbon Membranes Ltd., of Arava, Israel, The PPO (phenyl polyoxide) and derivatives (Ilinitch, O. M., Semin, G. L., Chertova, M. V., Zamaraev, K. I., Novel Polymeric Membranes for Separation of Hydrocarbons, J. Membr. Sci. 66 (1992) 1-8), The polyimides and the polymer alloys using polyimides, the polyimides based on 6FDA-type dianhydride (4,4'-(hexafluoroisopropylidene)diphthaleic acid) including 6FDA-TrMP (polyimide obtained from the condensation of a 6FDA-type dianhydride and a trimethylphenylene amine-type diamine) and 6FDA-TeMP (polyimide obtained from the condensation of a 6FDA-type dianhydric acid and a tetramethylphenylene amine-type diamine) that have an advantageous permeability/selectivity pair for the propylene/propane separation (SHIMAZU, A., Miyazaki, T., Maeda, M., Ikeda, K., Relationship Between the Chemical Structures and the Solubility, Diffusivity and Perinselectivity of Propylene and Propane in 6FDA-Based Polyimides, J. Polym. Sci. (B) 38 (2000) 2525-2536;

Tanaka, K., Taguchi, A., Hao, J., Kita, H., Okamoto, K., Permeation and Separation Properties of Polyimide Membranes to Olefins and Paraffins, J. Membr. Sci. 121 (1996) 197), perfluorinated polyimides, polymeric membranes made of copolymers of tetrafluoroethylene with 2,2,4-trifluoro-5-trifluoromethoxy-1,3-dioxole, such materials are available commercially from Ausimont S.p.A., of Milan, Italy under the trade name Hyflon® AD. Different grades are available varying in proportions of the dioxole and tetrafluoroethylene units, a second highly preferred material of this type is available commercially from Asahi Glass Company, of Tokyo, Japan under the trade name Cytop®.

Polyamides,

Aromatic polyamides,

Polyether imides,

Polyvinyl pyrrolidones,

Polycarbonates, and

Mixtures of polymers or copolymers using at least one of the cited polymers.

One can cite facilitated-transport membranes. These contain a liquid that itself contains, for example, free silver ions that reacts selectively and reversibly with unsaturated hydrocarbons, to selectively carry propylene across the membrane.

WO 2011037820 (A1) describes improved ionic liquid membrane and its preparation for separation of olefins/paraffins is described. The membrane comprises an ionic liquid with a metal salt. The ionic liquid includes a choline salt, selected from choline, chloride/hydroxide/bitratrate, phosphatidylcholine and is a deep eutectic liquid. The metal salt selected from silver, copper, gold, mercury, cadmium, zinc with choloride, nitrate, tetrafluoroborate, triflate, cyanide, thiocyanide, tetraphenylborate as anion. The ionic liquid is eutectic or a so-called deep eutectic liquid. The experimental examples use choline chloride, urea and silver nitrate/chloride and are tested for methane/ethene separation.

Because all of these preferred polymers are glassy and rigid, an unsupported film of the polymer is usable in principle as a single-layer gas separation membrane. However, such layers are normally far too thick to yield acceptable transmembrane flux, and preferably, the separation membrane comprises a very thin selective layer that forms part of a thicker structure, such as an asymmetric membrane or a composite membrane. The thin skin or coating layer is responsible for the separation properties and the underlying integral or discrete microporous support layer is responsible for mechanical strength. Additional layers can be added if desired, such as to seal the support layer before the selective layer is applied, to protect the surface from abrasion, and so on. The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are most preferred.

In an embodiment only a part of the splitter bottom stream, or of the scrubber overhead if any, is sent to the membrane separation zone, the remaining part is purged or recycled to the polymerization zone. Said proportion can vary widely according to the amount of ethane to be purged and the separation made by the membrane separation zone. By way of example 20 to 100% of the splitter bottom stream is sent to the membrane separation unit.

In an embodiment only a part of the splitter bottom stream of step e) is washed in a scrubber to remove contaminants and the overhead of said scrubber is sent to the membrane separation zone, the remaining part is purged or recycled to the polymerization zone. By way of example 20 to 100% of the splitter bottom stream is sent to the scrubber and then to the membrane separation unit.

As regards the debottlenecking process, detailed description is the same as hereabove described for the purging of propane in a polypropylene manufacturing process.

EXAMPLES

The following table describes the streams of a polypropylene production debottlenecking according to FIG. 1. The streams No are those of FIG. 1.

|  |  | STREAM | 2 | 3 | 4 | 5 | 6 | 7 | 8 | 9 |
|---|---|---|---|---|---|---|---|---|---|---|
|  |  | kg/hr | 31630 | 60000 | 30000 | 1630 |  |  |  | 28370 |
|  |  | Concentration (wt %): |  |  |  |  |  |  |  |  |
| Without membrane | 30 ton/hr PP (not according to the invention) | Propylene | 95 | 45 | 90 | 3 |  |  |  | 95 |
|  |  | Propane | 5 | 5 | 10 | 97 |  |  |  | 5 |
|  |  | PP poudre | — | 50 | — | — |  |  |  | — |
|  |  | kg/hr | 42173 | 80000 | 40000 | 3000 | 3000 | 2173 | 827 | 37827 |
|  |  | Concentration (wt %): |  |  |  |  |  |  |  |  |
| With membrane | 40 ton/hr PP | Propylene | 95 | 45 | 90 | 28 | 28 | 3 | 95 | 95 |
|  |  | Propane | 5 | 5 | 10 | 72 | 72 | 97 | 5 | 5 |
|  |  | PP poudre | — | 50 | — | — | — | — | — | — |

The invention claimed is:

1. A process comprising:
   a) polymerizing propylene in a polymerization zone;
   b) withdrawing from said polymerization zone an effluent comprising polypropylene, propylene, propane and optionally a solvent;
   c) sending said effluent to a separation zone thereby producing polypropylene, optionally the solvent and a stream comprising propylene and propane;
   d) optionally recycling the solvent to the polymerization zone;
   e) sending said stream comprising propylene and propane to a splitter thereby producing an overhead consisting essentially of propylene recycled to the polymerization zone and a rich propane bottom stream comprising a minor part of propylene;
   f) sending the rich propane bottom stream to a membrane separation zone thereby producing a permeate having an enhanced propylene content and a reduced propane content and a purge having an enhanced propane content and a reduced propylene content; and
   g) recycling the permeate to the polymerization zone.

2. The process of claim 1, wherein only a part of the rich propane bottom stream of the splitter is sent to the membrane separation zone, and wherein the remaining part of the rich propane bottom stream is purged or recycled to the polymerization zone.

3. The process of claim 1, wherein from 20 to 100 percent of the rich propane bottom stream of the splitter is sent to the membrane separation zone, and wherein any remaining part of the rich propane bottom stream is purged or recycled to the polymerization zone.

4. The process of claim 1, wherein the membrane separation zone comprise a membrane that exhibits a higher permeability for propylene than for propane.

5. The process of claim 1, wherein the stream comprising propylene and propane comprises form 0.5 to 30 weight percent propane and from 1 to 40 weight percent of propylene.

6. The process of claim 1, wherein the overhead of the splitter has a propylene content of at least 99.5 weight percent.

7. A process comprising:
   a) polymerizing propylene in a polymerization zone;
   b) withdrawing from said polymerization zone an effluent comprising polypropylene, propylene, propane and optionally a solvent;
   c) sending said effluent to a separation zone thereby producing polypropylene, optionally the solvent and a stream comprising propylene and propane;
   d) optionally recycling the solvent to the polymerization zone;
   e) sending said stream comprising propylene and propane to a splitter thereby producing an overhead consisting essentially of propylene recycled to the polymerization zone and a rich propane bottom stream comprising a minor part of propylene;
   f) washing the rich propane bottom stream produced in the splitter in a scrubber to remove contaminants and sending an overhead of said scrubber to a membrane separation zone, thereby producing a permeate having an enhanced propylene content and a reduced propane content and a purge having an enhanced propane content and a reduced propylene content; and
   g) recycling the permeate to the polymerization zone.

8. The process according to claim 7, wherein only a part of the overhead of the scrubber is sent to the membrane separation zone, and wherein the remaining part of the overhead of the scrubber is purged or recycled to the polymerization zone.

9. The process according to claim 7, wherein only a part of the rich propane bottom stream produced in the splitter is washed in the scrubber to remove contaminants and the overhead of said scrubber is sent to the membrane separation zone, and wherein the remaining part of the rich propane bottom stream produced in the splitter is purged or recycled to the polymerization zone.

10. The process according to claim 7, wherein from 20 to 100% of the rich propane bottom stream produced in the splitter is washed in the scrubber to remove contaminants and the overhead of said scrubber is sent to the membrane separation zone, and wherein any remaining part of the rich propane bottom stream produced in the splitter is purged or recycled to the polymerization zone.

11. A process comprising:
providing a membrane separation zone to a polypropylene manufacturing facility comprising:
a polymerization zone;
a separation zone to recover polypropylene, optionally a solvent and a stream comprising propylene and propane from the polymerization zone; and
a splitter to separate propane and propylene;
wherein:
the membrane separation zone is fed a bottoms stream of the splitter, thereby producing a purge and a permeate recycled to the polymerization zone; or
a scrubber is inserted between the bottoms of the splitter and the membrane separation zone to wash the bottoms stream of the splitter to remove contaminants, wherein the membrane separation zone is fed an overhead of the scrubber, thereby producing the purge and the permeate recycled to the polymerization zone.

12. The process of claim 11, wherein the membrane separation zone is fed the bottoms stream of the splitter, thereby producing the purge and the permeate recycled to the polymerization zone.

13. The process of claim 12, wherein only a part of the bottoms stream of the splitter is sent to the membrane separation zone, and wherein the remaining part of the bottoms stream of the splitter is purged or recycled to the polymerization zone.

14. The process of claim 11, wherein the scrubber is inserted between the bottoms of the splitter and the membrane separation zone to wash the bottoms stream of the splitter to remove contaminants, wherein the membrane separation zone is fed the overhead of the scrubber, thereby producing the purge and the permeate recycled to the polymerization zone.

15. The process of claim 14, wherein only a part of the overhead of the scrubber is sent to the membrane separation zone, the remaining part of the overhead of the scrubber is purged or recycled to the polymerization zone.

16. The process of claim 11, wherein a part of the bottoms stream of the splitter is washed in the scrubber to remove contaminants and the overhead of said scrubber is sent to the membrane separation zone, and wherein the remaining part of the bottoms stream of the splitter is purged or recycled to the polymerization zone.

* * * * *